(12) United States Patent
Ulmann et al.

(10) Patent No.: US 7,380,334 B2
(45) Date of Patent: Jun. 3, 2008

(54) DEVICE FOR PRE-STRESSING A WHEEL BEARING

(75) Inventors: Lothar Ulmann, Gadheim (DE); Karl Bywalez, Schweinfurt (DE)

(73) Assignee: FAG Kugelfischer AG, Schweinfurt (DE)

( * ) Notice: Subject to any disclaimer, the term of this patent is extended or adjusted under 35 U.S.C. 154(b) by 432 days.

(21) Appl. No.: 10/848,891

(22) Filed: May 19, 2004

(65) Prior Publication Data

US 2005/0005452 A1   Jan. 13, 2005

(51) Int. Cl.
B21D 53/10 (2006.01)
B21D 53/26 (2006.01)
F16C 19/20 (2006.01)
F16C 27/00 (2006.01)
F16C 13/00 (2006.01)

(52) U.S. Cl. ............... 29/724; 29/898.09; 29/894.362; 29/894.36; 29/725; 29/446; 384/544; 384/535; 384/520

(58) Field of Classification Search ............ 29/898.09, 29/894.362, 894.36, 725, 724, 446; 301/105.1; 280/93.512; 384/544, 539, 535, 520
See application file for complete search history.

(56) References Cited

U.S. PATENT DOCUMENTS 3,222,991 A * 12/1965 Bone ..................... 409/231
4,551,032 A * 11/1985 Mottershead ............ 384/517
6,112,411 A *  9/2000 Rutter .................. 29/898.07
6,575,476 B2 * 6/2003 McFadden ................ 279/16

* cited by examiner

Primary Examiner—David P. Bryant
Assistant Examiner—Alexander P Taousakis
(74) Attorney, Agent, or Firm—Chares A. Muserlian (57) ABSTRACT

A clamping device (1) for receiving and for the clearance-free prestressing of a wheel bearing comprises a clamping mechanism (3) which radially prestresses the wheel bearing (8) from the outside.

18 Claims, 6 Drawing Sheets

DEVICE FOR PRE-STRESSING A WHEEL BEARING

FIELD OF THE INVENTION

The invention relates to a device for prestressing a wheel bearing with an arbor rotating at least at times about an axis of rotation of the wheel bearing toward a clamping mechanism, wherein the clamping mechanism prestresses the wheel bearing in the device and wherein the arbor sets into rotational motion a flange, supported rotatably in an outer ring of the wheel bearing, about the rotational axis of the wheel bearing at least at those times when the wheel bearing is prestressed in the device.

BACKGROUND OF THE INVENTION

Such a device is described in DE 199 83 909 T1 wherein a wheel bearing with an axle spindle is received, which initially still has a clearance between the inner ring and the roller bodies as well as the outer ring and a flange of the wheel bearing arrangement is fixedly connected to the inner ring of the wheel bearing. For this purpose, the flange extends fixedly within a hollow cylindrical section, formed integrally on the flange, into the bore of the inner ring. The axle spindle, and consequently the outer ring, are secured on the device rotationally fixed with respect to the rotational axis of the wheel bearing. An arbor is disposed concentrically to the bearing rings and to the flange through the bore of the flange denoted in DE 199 83 909 by wheel hub.

The device exerts a clamping force on the wheel hub and on the inner ring of the wheel bearing to generate the prestress in the wheel bearing, which prestress corresponds to the conventional factory prestressing of the wheel bearing on the vehicle. After the generation of such a prestress on the inner ring, the arbor is set in rotation and then carries along the flange rotating about the axis of rotation of the wheel bearing arrangement. The flange of the wheel bearing with the wheel bearing arrangement prestressed in such a manner can now be worked with a precision corresponding to the motor vehicle operation with respect to the axial run-out or the lateral run-out deviations. However, with this solution, satisfactory per se, the danger exists that during axial prestressing of the inner ring, the weakest sites of the inner ring on the raceways will be deformed such that the closeness required for optimum roller contact in the raceways to the roller bodies is disadvantageously deformed. Simultaneously, the danger exists that the ball[s] in the axial deformation of the inner ring and during the radial prestressing of the bearing rings with respect to one another, leave markings generated by plastic deformation, which disadvantageously shorten the service life of the wheel bearing.

OBJECTS OF THE INVENTION

It is an object of the invention to provide a device according to the species, with which the above listed disadvantages are avoided.

It is another object of the invention to provide a device with which the radial run-out and the lateral run-out can be tested at the flange or at a brake disk connected with the wheel bearing arrangement under operating conditions independently of the motor vehicle. These and other objects and advantages of the invention will become obvious from the following detailed description.

THE INVENTION

The device (1, 19, 24) of the invention for prestressing a wheel bearing (8), comprises an arbor (2, 26) rotating at least at times about a rotational axis (8*a*) of the wheel bearing (8) with respect to a clamping mechanism (3), wherein the clamping mechanism (3) prestresses the wheel bearing (8) in the device (1, 19, 24) and wherein the arbor (2, 26) sets into rotational motion about the rotational axis (8*a*) of the wheel bearing (8), a flange (11) rotatably supported in an outer ring (8*b*) of the wheel bearing (8), at least at those times when the wheel bearing (8) is prestressed in the device (1, 19, 24), wherein the clamping mechanism (3) is disposed rotationally fixed with respect to the device (1, 19, 24) and for prestressing the wheel bearing (8) in the device (1, 19, 24) is movable from outside radially in the direction of the rotational axis (8*a*) against the outer ring (8*b*). The clamping mechanism in the device prestresses the wheel bearing from the outside radially in the direction of the rotational axis and comprises at least one clamping element movable against the outer ring as well as rotationally fixed with respect to the device. The outer ring is encompassed circumferentially by the clamping element(s). The wheel bearing is prestressed free of clearance via the outer ring and, moreover, with the same prestress as the same drive-operation ready wheel bearing mounted on the motor vehicle. Accordingly, the wheel bearing is clamped in the device with the later operational prestress. Deformations on the geometry of the raceways due to axial prestresses are avoided, since the outer ring is operationally at least partially radially constricted from the outside plastically as well as elastically in the device, in other words its diameter is decreased.

A prerequisite for the wheel bearing to be radially prestressed are inner rings of the wheel bearing which are fixed in place axially relative to the wheel bearing and axially with respect to one another and, consequently, axially immovable, if, instead of only one, two of the inner rings are set into the wheel bearing. The inner rings are axially fixed with respect to one another, for example by means of the flange section on which they are seated. For that purpose, for example, a flanged rim, also referred to as a roller rivet joint, is generated, which prestresses the inner rings axially against each other and holds these in contact together. Individual inner rings not braced with such a section, are braced, for example, by clamping bolts axially with respect to one another and fixed.

After the removal of the wheel bearing or the wheel bearing unit from the device, the outer ring resiliently rebounds again to the extent to which it had been elastically prestressed, such that the wheel bearing arrangement after the removal from the device, has again the clearance that existed initially. Intentional plastic deformations of the outer ring remain.

Two uses for the device of the invention are intended. For one, the flange on the wheel bearing unit clamped with operating stress in the device is worked by machining with a high precision of concentric running and axial running. Alternatively, it is, furthermore, also provided to work with high precision a brake disk secured on the flange of the wheel bearing arrangement. The arbor, connected torsion-tight with the wheel bearing, generates the necessary rotation of the flange. Furthermore, by means of the device of the invention, the deviations from concentric running and axial running under operating conditions of the rotating flange or of the rotating brake disk can be checked on the flange in the bearing prestressed with operating prestress with suitable measuring means. Measurements are carried out either after the machining working in the fabrication area and/or separately from the machining working in the fabrication area and/or separately from the machining working in the quality control.

The clamping element with the arbor rotating is preferably movable prestressing radially against the outer ring. The radial prestress is consequently not exerted in the static state of the bearing, but rather is only exerted onto the bearing when the inner ring rotates relative to the outer ring fixed on the device and the roller bodies roll out on the raceways. Spot-form markings through the roller bodies in the raceways of the bearing rings are consequently avoided. The running quality, and consequently the service life, of the wheel bearing arrangement is considerably increased.

Accordingly, one prerequisite is the rotating driving of the inner rings with respect to the outer ring(s) fixed on the device. The arbor, for this purpose, drives the flange and, depending on the implementation of the device, is brought to the wheel bearing arrangement axially from the sides of the end face, directed axially toward the outside away from the wheel bearing, of the flange or from a direction axially opposite thereto. Between the arbor and the flange, alternatively between the arbor and a hollow cylindrical section on the flange seated concentrically inwardly with respect to the inner rings, or between the arbor and the inner rings, is established either a form-fit or a frictional closure rotational connection. Wheel bearing arrangements for driven wheels comprise, as a rule, on the inner circumferential side on the section of the flange extending axially through the inner rings and staying the inner rings radially and axially, a splining or the like for engaging the drive.

This inner splining is preferably utilized in the working of the wheel bearings in the device of the invention for the driving by the arbor. For this purpose, the arbor is provided with an outer notching, with which the arbor engages the inner notching on the flange and via which a form-fit is established. If such a splining is omitted, all conceivable force-friction closure and further form-fit and detachable connections between the arbor and the flange or the inner ring(s) are provided.

Further implementations as well as embodiments of the invention are explained in further detail in the section "Detailed Description of the Drawing".

The invention further provides a method for the clearance-free prestress of a wheel bearing with a device of the invention. Therein, the following method steps are comprised:

1) the wheel bearing is first introduced axially into the device with the outer ring against an axial stop. Between the clamping mechanism and the outer diameter of the outer ring of the wheel bearing, initially a large radial clearance is present, such that the wheel bearing with the outer ring can be introduced into the clamping mechanism axially up to the stop. On the stop, the bearing is first aligned, for which reasons preferably a three-point contact of the stop is provided.
2) The clamping mechanism clamps the wheel bearing unit initially exclusively for holding it fixed in the device. The clamping forces produced by the clamping mechanism are so low that no elastic deformations of the outer ring, and consequently no changes of the bearing clearance, are generated.
3) The arbor is moved to the flange before, concurrently or after the clamping-in of the outer ring into the clamping mechanism, and brought with the flange into a force-friction closure or into a form-fit closure.
4) By means of the arbor, the flange is driven rotating about the rotational axis.
5) The outer ring is radially deformed by means of the clamping tool with the arbor rotating and consequently with the flange rotating by constriction so far until the clamped-in bearing is clearance-free and prestressed, and optionally deformed further.
6) the rotating flange or optionally the brake disk secured on the flange is worked on the prestressed bearing by machining, if necessary, and/or is tested.

DETAILED DESCRIPTION OF THE DRAWING

Figure 1:
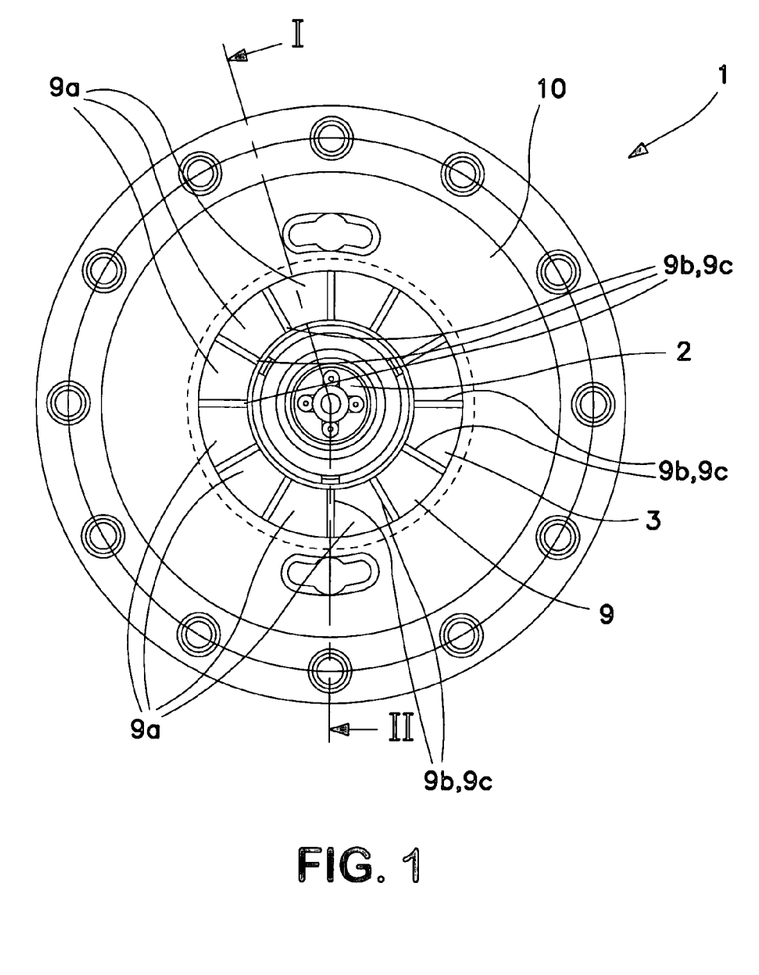
FIG. 1 is a front view of a device of the invention.
Figure 2:
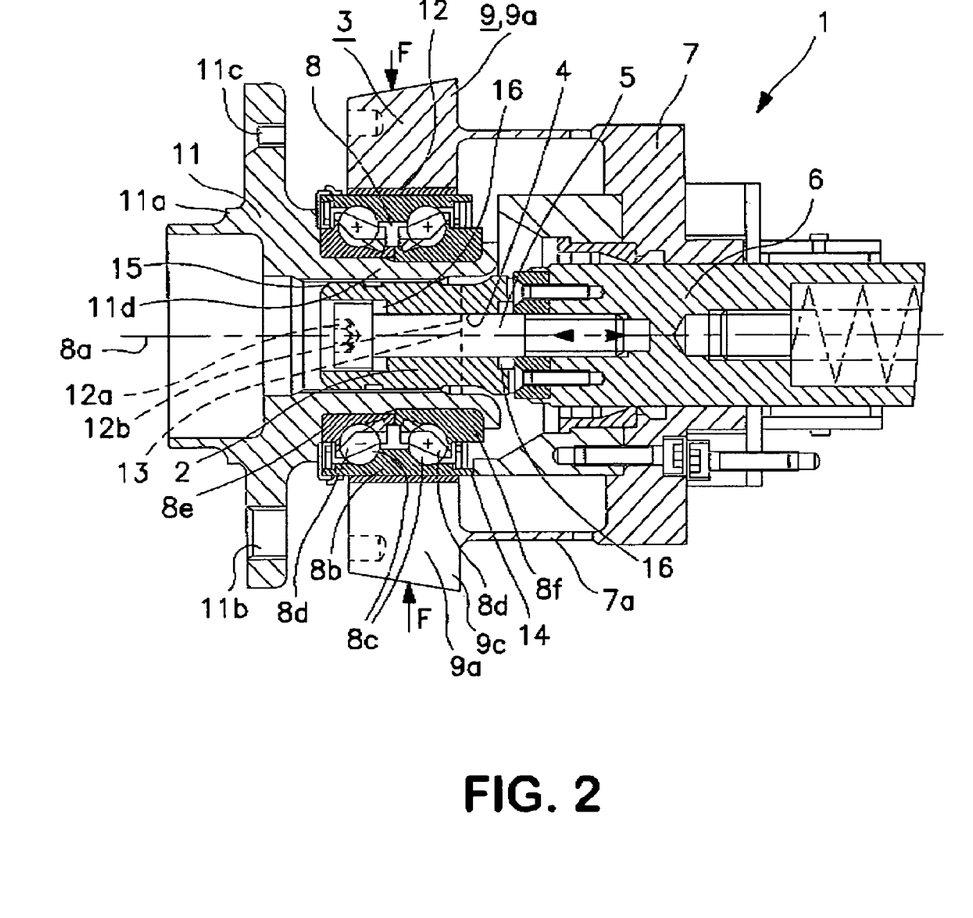
FIG. 2 is the device according to FIG. 1 in a sectional representation along line II-II of FIG. 1 without clamping element.

FIG. 1 shows a front view of a device 1 of the invention and in FIG. 2 is shown a longitudinal section through this device 1. The device 1 is substantially formed by an arbor 2 rotatable relative to the device and a clamping mechanism 3. The arbor 2 is rotationally symmetrical and provided with an axial through-bore 1. An axial bolt 5 extends through the through-bore 4 and the axial bolt 5 is axially screwed into a drive shaft 6. The drive shaft 6 is supported relative to the device, and therewith to a carrier 7, about the rotational axis 8a of a wheel bearing 8 in the carrier 7. With respect to carrier 7, the clamping mechanism 3, in the form of an elastic chuck 9, is fixed and the elastic chuck 9 comprises several clamping jaws 9a uniformly distributed at the circumferential side about the axis of rotation 8a.

In FIG. 1, the device 1 is depicted without the wheel bearing and with a front plate 10 which front plate 10 is omitted in the graphic representation according to FIG. 2. As is especially evident in FIG. 1, each clamping jaw 9a is separated by a gap 9b from a circumferentially adjacent clamping jaw 9a. Each gap 9b is filled with an elastic material 9c, for example a highly resilient elastomer. The elastic material 9c is preferably vulcanized at the flank side onto the clamping jaws 9b or injected into the gap 9b. As is evident from FIG. 2, the clamping jaws 9a are secured on a hollow cylindrical elastic ring developed integrally in terms of material with the clamping jaws, which ring extends axially from the clamping jaws 9a to the carrier 7 and is fixed on carrier 7.

The wheel bearing 8 is formed of an outer ring 8b, roller bodies 8c in the form of balls, ball cages 8d, inner rings 8e and 8f and a flange 11. The flange 11 comprises a centering seat 11a for a wheel rim, not shown, of a motor vehicle wheel. Flange bores 11b and 11c as well as a hollow cylindrical section 11d are developed integrally with the flange 11. The inner rings 8e and 8f are seated concentrically and fixedly on the section 11*d*. A flanged rim 11*e* prestresses the inner rings 8*e* and 8*f* axially against one another.

An intermediate ring 12 is seated radially between the clamping jaws 9*a* and the outer ring 8*b* which intermediate ring is hollow cylindrically and implemented with very thin walls as well as disposed concentrically with respect to the outer ring 8*b*. The intermediate ring is slotted in the circumferential direction of the intermediate ring 12, such that between its ends 12*a* and 12*b*, directed at the circumferential side toward one another, a compensation gap 13 is developed. By using such an intermediate ring 12 in the clamping mechanism 3, it is possible to set into the device different wheel bearings, whose outer rings vary in outer diameter in a range from zero of the wall thickness up to twofold magnitude of the wall thickness of the intermediate ring 12. It is also conceivable to employ intermediate rings with greater or smaller radial wall thickness than with the wall thickness of the intermediate ring 12. It is also conceivable to employ intermediate rings with greater or smaller radial wall thickness than with the wall thickness of the intermediate ring 12.

With the forces F acting in the direction of the arrow, the clamping jaws 9*a* clamp closed radially in the direction of the rotational axis 8*a*. The wheel bearing 8 is first clamped with low forces into the device 1, wherein the wheel bearing 8 is aligned on three of the stops 14, of which only one is shown in the drawing. The arbor 2 is movable with the drive shaft 6 in the axial directions denoted by the double arrow and can therefore be brought into form-fit engagement with section 11*d*. The form-fit closure between section 11*d* and arbor 2 is established by a splining 15. Axial offset between the center axis of arbor 2 and the rotational axis of the inner ring 8*e* are compensated by the arbor 2 supported by a cardanic joint on the axial bolt via rubber-elastic compensation elements 16. The arbor 2 is for this purpose with the cylindrical wall of the through-bore 4 spaced apart from the axial bolt 5 such that it is supported floatingly on the compensation elements 16 stayed on the axial bolt 5.

The forces denoted by F in FIG. 2 onto the clamping jaws 9*a* are generated by at least one clamping element 17 of device 1. In the following, different embodiments of the invention are described, in which different clamping elements are provided. According to the representation after FIG. 3, the clamping element 17 is a rigid clamping ring 18 disposed concentrically with the clamping jaws which clamping ring 18 encompasses the clamping jaws 9*a* radially on the outside as well as closed circumferentially. On the clamping ring 18, an inner cone 18*a* is developed. The clamping ring 18 with respect to the clamping jaws 9*a*, and therein axially aligned with the rotational axis 8*a*, is displaceable against the clamping jaws 9*a* and away from the clamping jaws 9*a*. For clamping closed the clamping mechanism 3, the clamping ring 18 is pressed axially against the clamping jaws 9*a* and therein is radially on the outside on the clamping jaws 9*a* at least in sections. The possible movement directions of the clamping ring 18 are marked in FIG. 3 by a double arrow denoted by A1. The clamping jaws 9*a*, through contact with the inner cone 18*a*, with the clamping ring moved is forced to yield in the direction denoted by arrow A2 and to constrict the outer ring 8*b* elastically.

Figure 3:
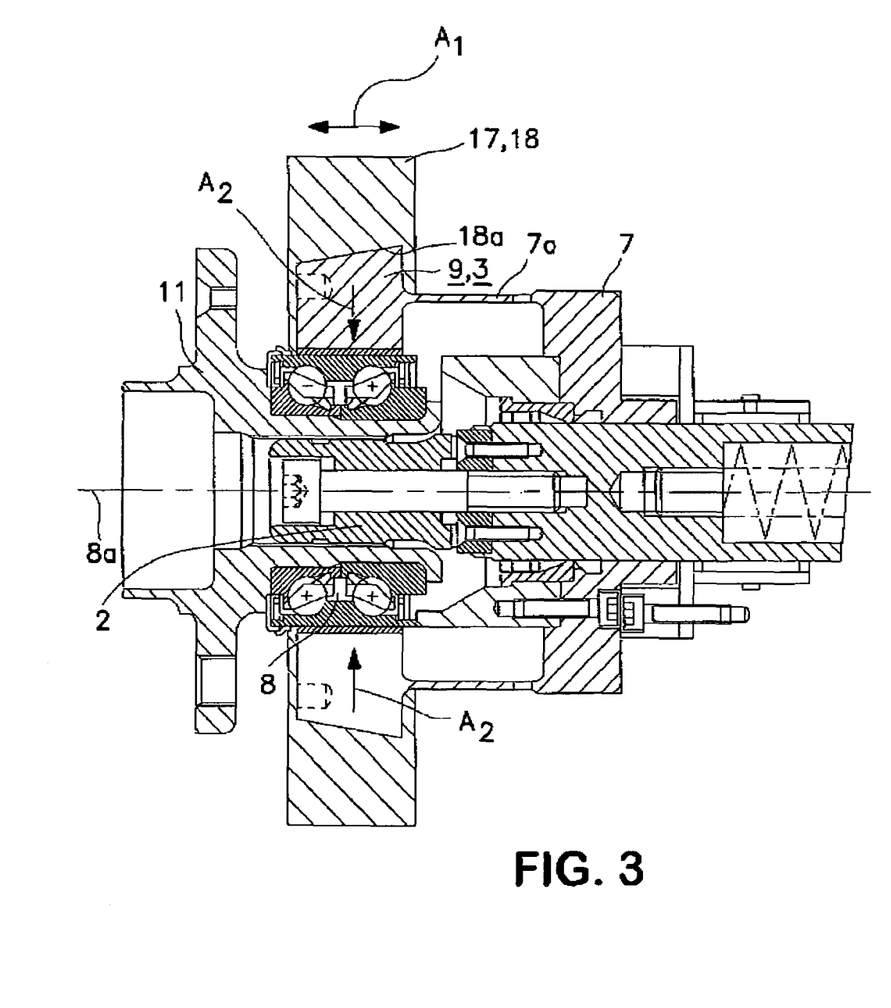
FIG. 3 is the device of FIG. 1 with a clamping element in the form of a clamping ring.

The clamping jaws 9*a* brought close to one another through the clamping-closed forces circumferentially via the gap 9*b*, compress the elastic material 9*c*. In the elastic material 9*c* consequently during the prestressing of the wheel bearing 8, a compression stress is present, which, after clamping-closed forces are removed, moves the clamping jaws 9*a* circumferentially away from one another and consequently releases the wheel bearing 8.

Figure 4:
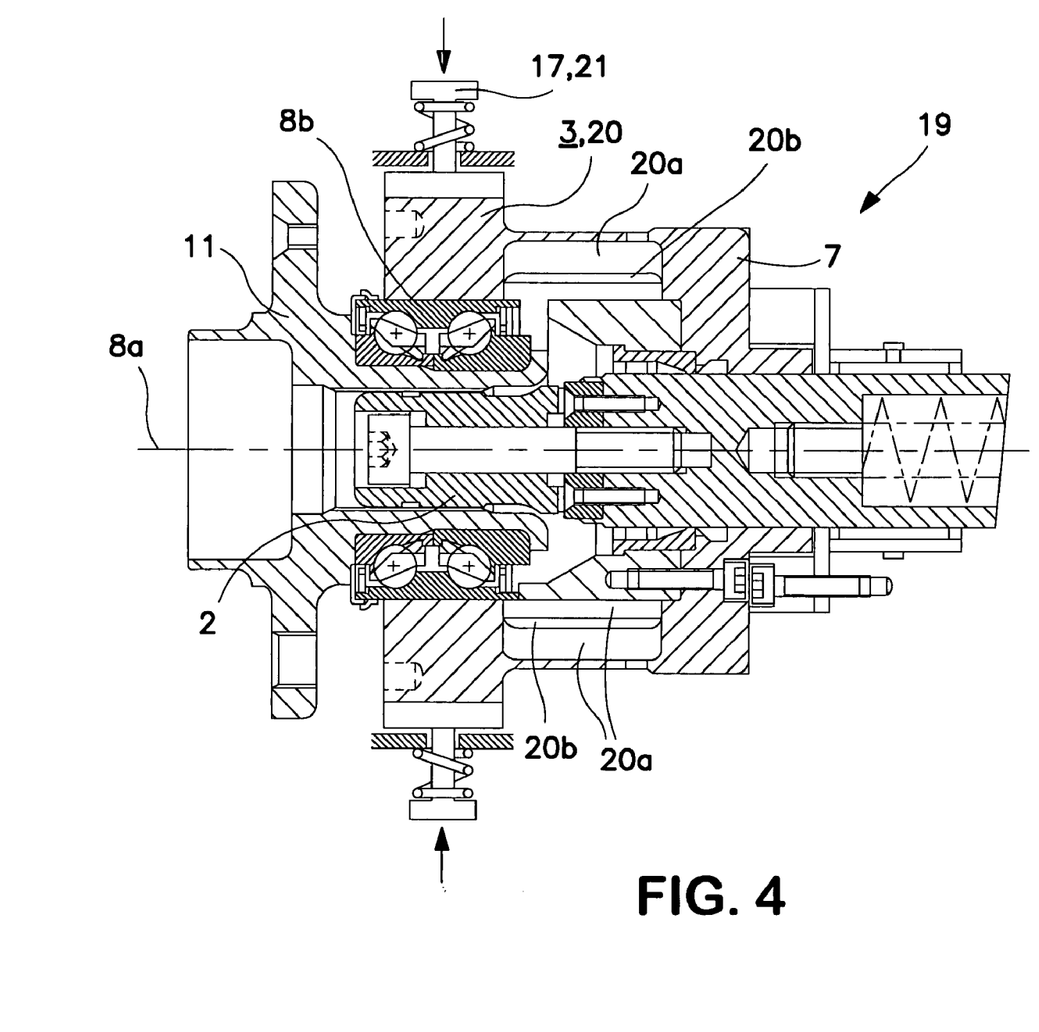
FIG. 4 is the device according to FIG. 1 with an alternative clamping element in the form of radially acting pistons.

FIG. 4 depicts a device 19, whose structure corresponds substantially to the structure of device 1. In contact on the clamping jaws 20, minimally modified in comparison to the clamping jaws 9*a* of device 1, are clamping elements 17 in the form of stroke-movable pistons 21. During the clamping into the device 19 and the prestressing of the wheel bearing 8 in the device 19, an hydraulic, optionally mechanically initiated, force acts onto the piston 21. The clamping jaws 20 yield radially elastically in the direction of the outer ring 8*b* and prestress it or constrict it. Each of the clamping jaws 20 is elastically fixed with respect to carrier 7 by means of a lever 20*a* which levers 20*a* are circumferentially separated from one another by longitudinal slots 20*b*.

Figure 5:
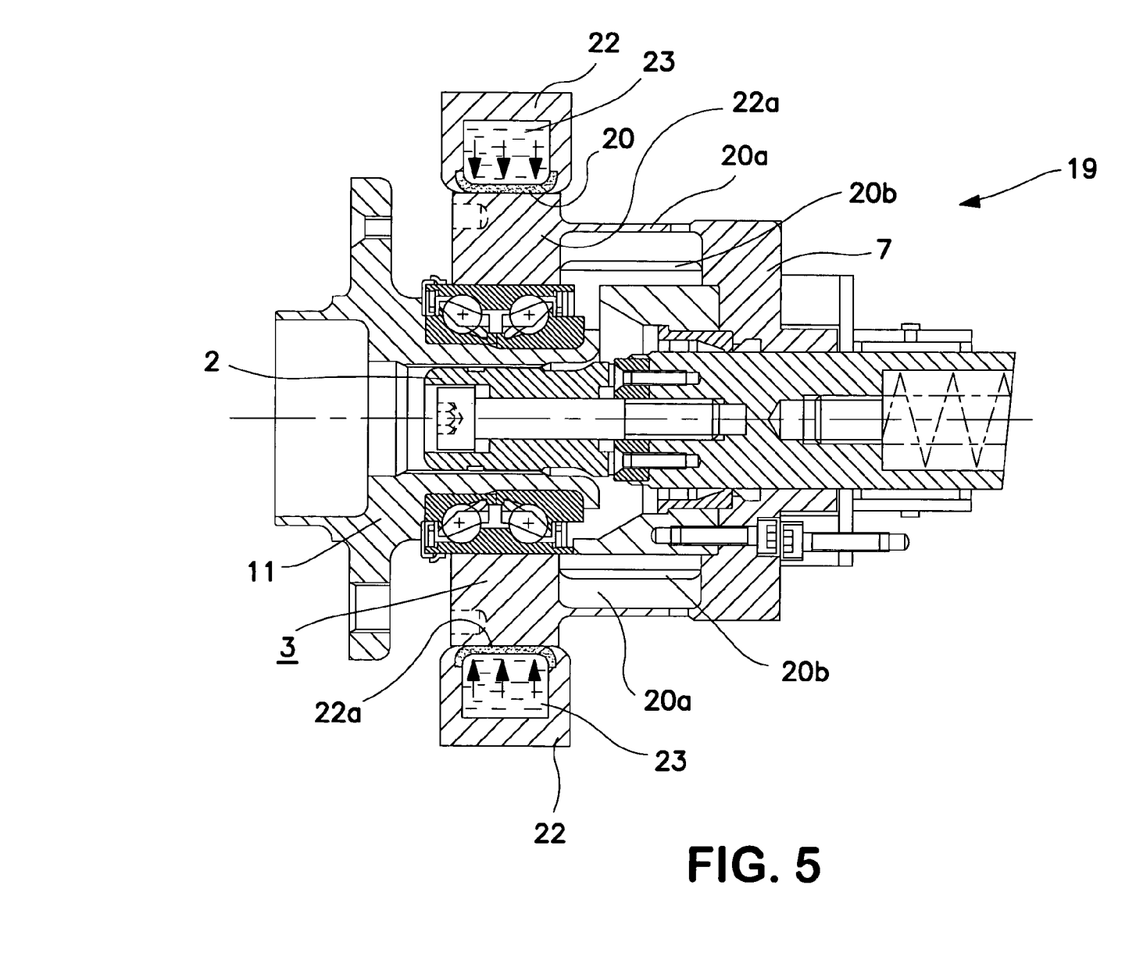
FIG. 5 is the device according to FIG. 1 with a further alternative clamping element in the form of an hydraulic pressure chamber.

FIG. 5 depicts the device 19 with a further implementation of a clamping element 17, which clamping element 17 is an hydraulic pressure chamber 22 encompassing the clamping jaws 20 circumferentially about the rotational axis 8*a*. The pressure chamber 22 is pressurized with an hydraulic pressure fluid 23. The hydraulic pressure in the pressure chamber 22 leads to the bulging-out of the pressure chamber 22 at its weakest site. The weakest site or the pressure chamber 22 is the thin wall (optionally also one or several radially movable pistons) 22*a* directed radially inwardly, which bulges out radially inwardly and acts on the clamping jaws 20.

Figure 6:
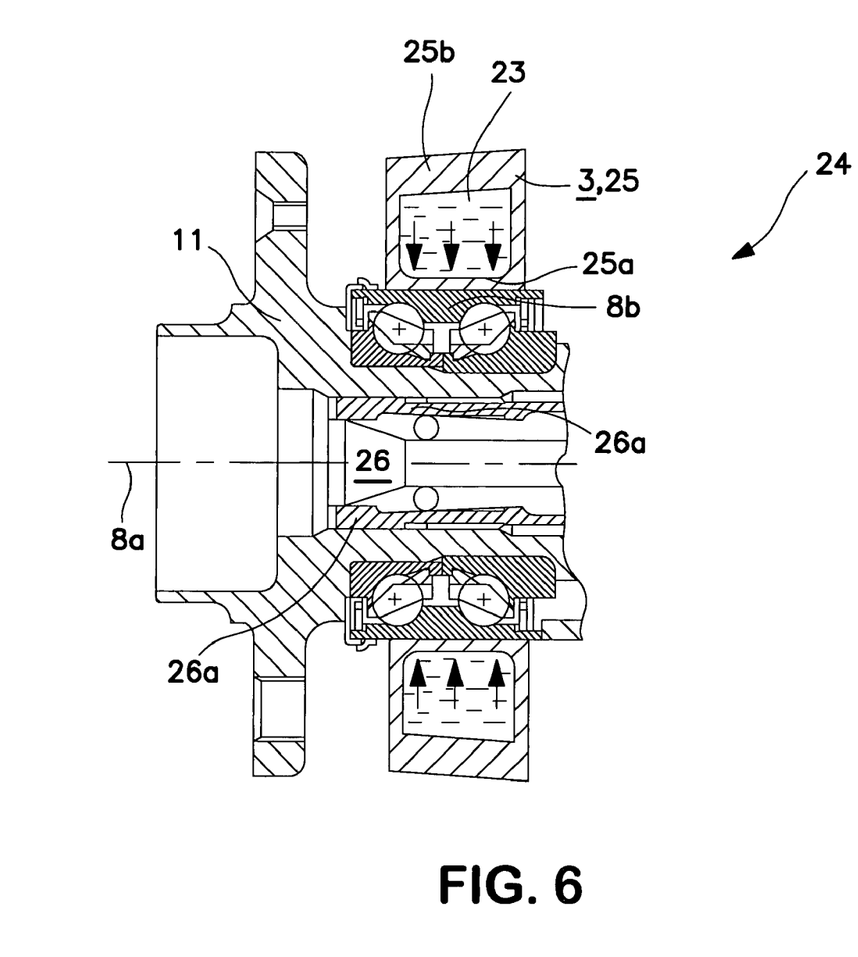
FIG. 6 is a further device according to the invention, in which the clamping elements are formed by an inner-elastic hydraulic pressure chamber and in which the arbor is in contact by means of spreading jaws under friction force closure against the flange.

FIG. 6 depicts a device 24 partially in section. The device 24 comprises an hydraulic pressure chamber 25 as a clamping mechanism 3, which chamber is filled with an hydraulic pressure fluid 23. The thin wall 25*a* of pressure chamber 25 bulges under pressure radially inwardly and constricts the outer ring under high pressure, such that the wheel bearing 8 is prestressed. The radially outer thick wall 25*b* of pressure chamber 25 remains rigid even under high pressures. During the radial prestressing of the outer ring 8*b*, flange 11 of wheel bearing 8 is connected under force-friction closure with an arbor 26 and rotates with it about the rotational axis 8*a*. The force friction closure between arbor 26 and flange 11 is generated through a radial spreading open of arbor 26, for which reason the arbor 26 comprises spreading jaws 26*a* which are movable radially outwardly. Via the spreading jaws, the clamping diameter of arbor 26 is variable, such that the arbor 26 is also adaptive with respect to wheel bearings with differing inner dimensions of the flange. Conceivable for these purposes are also adaptive arbors, which are provided with compensation rings, for example of rubber, which have either fixed or variable diameters.

What is claimed is:

1. A device for prestressing a wheel bearing, comprising an arbor rotating at least at times about a rotational axis of the wheel bearing with respect to a clamping mechanism, wherein the clamping mechanism prestresses the wheel bearing in the device and wherein the arbor sets into rotational motion about the rotational axis of the wheel bearing a flange rotatably supported in an outer ring of the wheel bearing, at least at those times when the wheel bearing is prestressed in the device, wherein the clamping mechanism is disposed rotationally fixed with respect to the device and for prestressing the wheel bearing in the device is movable from outside radially in the direction of the rotational axis against the outer ring, the clamping mechanism is adaptive to outer rings differing from one another in their outer diameter by means of at least one thin-walled as well as elastically deformable intermediate ring developed as a hollow cylinder, radially between the clamping mechanism and the outer ring.

2. A device of claim 1, wherein a clamping mechanism elastically prestresses the outer ring.

3. A device of claim 1, wherein the clamping mechanism, with rotating arbor is radially movable against the outer ring so that it has prestressing action.

4. A device of claim 1 wherein a close-clamping force of the clamping mechanism acting radially on all sides of at least 10 to 30 kiloNewtons with which the wheel beating can at least be elastically prestressed.

5. A device of claim 1 wherein a circumferentially uniform radial clamping stroke of the clamping mechanism of at least 25 micrometers.

6. A device of claim 1 wherein the rotating arbor is connected form-fittingly with the flange.

7. A device of claim 1 wherein the rotating arbor is connected force-fictionally with the flange.

8. A device of claim 1 wherein between the rotating arbor and between the flange driven by means of the rotating arbor at least a circumferential torque one Newton meter can be transmitted.

9. A device of claim 1 wherein the rotating arbor engages a hollow cylindrical section of the flange developed integrally with the flange.

10. A device of claim 1 wherein the rotating arbor engages a hollow cylindrical section of the flange developed integrally with the flange and that the rotating arbor is laid out such that it is adaptive with respect to differing inner diameters of the section.

11. A device of claim 1 wherein the arbor is cardanically suspended in the device such that it is radially inclinable and centrally centerable, whereby the position of the center axis of the arbor is adapted to the position of the rotational axis of the wheel bearing.

12. A device of claim 1 wherein the device comprises at least one axial stop fixed with respect to the device, against which the outer ring abuts axially before a clamping closure of the clamping mechanism and is aligned.

13. A device for prestressing a wheel bearing, comprising an arbor rotating at least at times about a rotational axis of the wheel bearing with respect to a clamping mechanism, wherein the clamping mechanism prestresses the wheel bearing in the device and wherein the arbor sets into rotational motion about the rotational axis of the wheel bearing a flange rotatably supported in an outer ring of the wheel bearing, at least at those times when the wheel bearing is prestressed in the device, wherein the clamping mechanism is disposed rotationally fixed with respect to the device and for prestressing the wheel bearing in the device is movable from outside radially in the direction of the rotational axis against the outer ring, the clamping mechanism comprises several clamping jaws uniformly distrubuted on the circumference about the rotational axis, and wherein the clamping jaws are movable synchronously and radially from the outside in the direction of the rotational axis and therein the outer ring at least partially is coustrictable by the clamping jaws at least elastically, decreasing the diameter and each of the clamping jaws is separated by a gap from a circumferentially adjacent clamping jaw which gap is filled with an elastic material, wherein the adjacent clamping jaws are circumferentially connected by the elastic material.

14. A device of claim 13, wherein each clamping jaw is secured stationarily on the device to the rotating arbor with a lever.

15. A device of claim 14, wherein the lever is secured on a side facing away from the flange on the clamping jaw and that the lever is therein fixed on the device axially away from the clamping jaw.

16. A device of claim 13, wherein the clamping jaws are acted upon by means of at least one clamping element radially in the direction of the rotational axis.

17. A device of claim 16, wherein the clamping element is disposed concentrically to the clamping jaws and is therein a rigid clamping ring encompassing the clamping jaws outside as well as circumferentially closed, wherein the clamping ring comprises an inner cone and is displaceable relative to the clamping jaws and therein axially aligned with the rotational axis against the clamping jaws and wherein the inner cone is radially outside in contact on the clamping jaws at least in sections and therein the clamping jaws are movable perforce radially inwardly by means of the axially movable clamping ring.

18. A device of claim 16, wherein the clamping element is at least one hydraulic pressure chamber circumferentially encompassing the clamping jaws about the rotational axis, wherein the pressure chamber is filled with an hydraulic pressure fluid as well as is formed to be elastically flexible radially inwardly and at least rigid radially outwardly and wherein the clamping jaws are movable perforce radially inwardly by means of the pressure chamber.

* * * * *